US011111780B2

(12) United States Patent
Barfoot et al.

(10) Patent No.: US 11,111,780 B2
(45) Date of Patent: Sep. 7, 2021

(54) DISTRIBUTED ACOUSTIC SENSING SYSTEM WITH PHASE MODULATOR FOR MITIGATING FADED CHANNELS

(71) Applicant: HALLIBURTON ENERGY SERVICES, INC., Houston, TX (US)

(72) Inventors: David Andrew Barfoot, Houston, TX (US); John Herbert Dailing, Los Angeles, CA (US); Ira Jeffrey Bush, Los Angeles, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 16/477,094

(22) PCT Filed: Feb. 21, 2017

(86) PCT No.: PCT/US2017/018654
§ 371 (c)(1),
(2) Date: Jul. 10, 2019

(87) PCT Pub. No.: WO2018/156099
PCT Pub. Date: Aug. 30, 2018

(65) Prior Publication Data
US 2019/0353029 A1 Nov. 21, 2019

(51) Int. Cl.
*E21B 47/107* (2012.01)
*E21B 47/135* (2012.01)
(Continued)

(52) U.S. Cl.
CPC .......... *E21B 47/107* (2020.05); *E21B 47/135* (2020.05); *G01H 9/004* (2013.01);
(Continued)

(58) Field of Classification Search
CPC ..... E21B 47/107; E21B 47/135; G01N 29/14; G01N 2291/02836; G01N 2291/02881
(Continued)

(56) References Cited

U.S. PATENT DOCUMENTS 5,321,503 A * 6/1994 Bramson .............. G01C 19/726
356/464
5,748,318 A * 5/1998 Maris ................. G01N 21/1702
356/630

(Continued)

FOREIGN PATENT DOCUMENTS

GB 2222247 A 2/1990
WO 2013011283 A2 1/2013
(Continued)

OTHER PUBLICATIONS

PCT/US2017/018654, "International Search Report and Written Opinion", dated Nov. 21, 2017, 10 pages.
(Continued)

*Primary Examiner* — John Fitzgerald
*Assistant Examiner* — Rodney T Frank
(74) *Attorney, Agent, or Firm* — Kilpatrick Townsend & Stockton LLP

(57) ABSTRACT

Faded channels in a distributed acoustic sensing system can be mitigated using a phase modulator. A first pulse and a second pulse of an optical signal can be determined. A phase modulator can modulate the first pulse to have a different wavelength than the second pulse. The first pulse can be launched into a sensing fiber that extends into a wellbore. A first backscattered signal can be received from the sensing fiber in response to the first pulse being launched into the sensing fiber. The second pulse can be launched into the sensing fiber and a second backscattered signal can be received from the sensing fiber. Data about an environment
(Continued)

of the wellbore can be determined by processing the first backscattered signal and the second backscattered signal to compensate for fading in the first backscattered signal or the second backscattered signal.

16 Claims, 7 Drawing Sheets

(51) Int. Cl.
    *G01H 9/00*         (2006.01)
    *G01N 29/14*       (2006.01)
    *G01N 29/24*       (2006.01)
    *G02B 26/06*       (2006.01)

(52) U.S. Cl.
    CPC ......... *G01N 29/14* (2013.01); *G01N 29/2418* (2013.01); *G01N 2291/02836* (2013.01); *G01N 2291/02881* (2013.01); *G02B 26/06* (2013.01)

(58) Field of Classification Search
    USPC ..................................................... 73/152.32
    See application file for complete search history.

(56) References Cited

U.S. PATENT DOCUMENTS

| | | | |
|---|---|---|---|
| 7,271,884 | B2 | 9/2007 | Payton et al. |
| 7,668,411 | B2 | 2/2010 | Davies et al. |
| 7,764,363 | B2 | 7/2010 | Lewis et al. |
| 9,140,582 | B2 | 9/2015 | Parker et al. |
| 9,170,149 | B2 | 10/2015 | Hartog et al. |
| 2005/0254058 | A1* | 11/2005 | Alphonse ........... A61B 5/14558 356/479 |
| 2009/0091765 | A1* | 4/2009 | Chow ................ G01B 9/02007 356/477 |
| 2011/0088462 | A1 | 4/2011 | Samson et al. |
| 2012/0067118 | A1* | 3/2012 | Hartog ............... G01D 5/35361 73/152.16 |
| 2012/0069332 | A1* | 3/2012 | Frankel ...................... G01J 3/44 356/301 |
| 2012/0278043 | A1* | 11/2012 | Lewis ................ G01D 5/35387 702/189 |
| 2012/0297883 | A1* | 11/2012 | Kupershmidt ......... G01H 9/004 73/655 |
| 2013/0113629 | A1* | 5/2013 | Hartog ............... G01D 5/35303 340/853.2 |
| 2014/0153364 | A1* | 6/2014 | Lewis .................... G01V 1/226 367/41 |
| 2014/0255023 | A1* | 9/2014 | Kishida ................ H04B 10/071 398/21 |
| 2015/0308864 | A1* | 10/2015 | Paulsson ................ G01H 9/004 73/152.16 |
| 2016/0146661 | A1 | 5/2016 | Martin et al. |
| 2020/0249075 | A1* | 8/2020 | Ma ..................... G01D 5/35361 |

FOREIGN PATENT DOCUMENTS

| | | |
|---|---|---|
| WO | 2013066654 A1 | 5/2013 |
| WO | 2015170113 A1 | 11/2015 |

OTHER PUBLICATIONS

Barfoot, "Efficient Vertical Seismic Profiling using Fiber-Optic Distributed Acoustic Sensing and Real-Time Processing", Second EAGE Workshop on Borehole Geophysics., 2013, 3 pages.

* cited by examiner

DISTRIBUTED ACOUSTIC SENSING SYSTEM WITH PHASE MODULATOR FOR MITIGATING FADED CHANNELS

TECHNICAL FIELD

The present disclosure relates generally to a distributed acoustic sensing system for interrogating a wellbore and, more particularly (although not exclusively), to a distributed acoustic sensing system with a phase modulator for mitigating faded channels.

BACKGROUND

A distributed acoustic sensing system can be used in a well system to determine data about an environment of a wellbore. The distributed acoustic sensing system can include an optical source for transmitting an optical signal through an optical fiber that extends into a wellbore and an optical receiver for receiving a backscattered optical signal generated by the optical signal propagating through the optical fiber. The backscattered optical signal can be processed by the distributed acoustic sensing system to determine the data about the environment of the wellbore. Portions or channels of the backscattered signal can include noise such that the portion of the backscattered signal is considered faded and unsuitable for determining the data. In some examples, a faded channel can exist in a backscattered signal that experiences destructive contrast such that the coherent power level of the channel is below a threshold value. In some aspects, the threshold value can be determined based on a desired quality (e.g., accuracy) of the data.

A distributed acoustic sensing system can be used to measure the effects of a hydraulic fracturing operation. Hydraulic fracturing can include pumping a treatment fluid that includes a proppant mixture into a wellbore formed through the subterranean formation. The treatment fluid can create perforations in the subterranean formation and the proppant mixture can fill the perforations to prop the perforations open. The flow of the treatment fluid through the wellbore can create acoustic signals that vibrate the sensing fiber and cause measurable changes in a backscattered optical signal. The distributed acoustic sensing system can detect these changes and determine the intensity and location of the source of the acoustic signals based on the backscattered signal. The intensity and location of the source of the acoustic signal can be used by the distributed acoustic sensing system to determine data about the environment of the wellbore.

DETAILED DESCRIPTION

Figure 1:
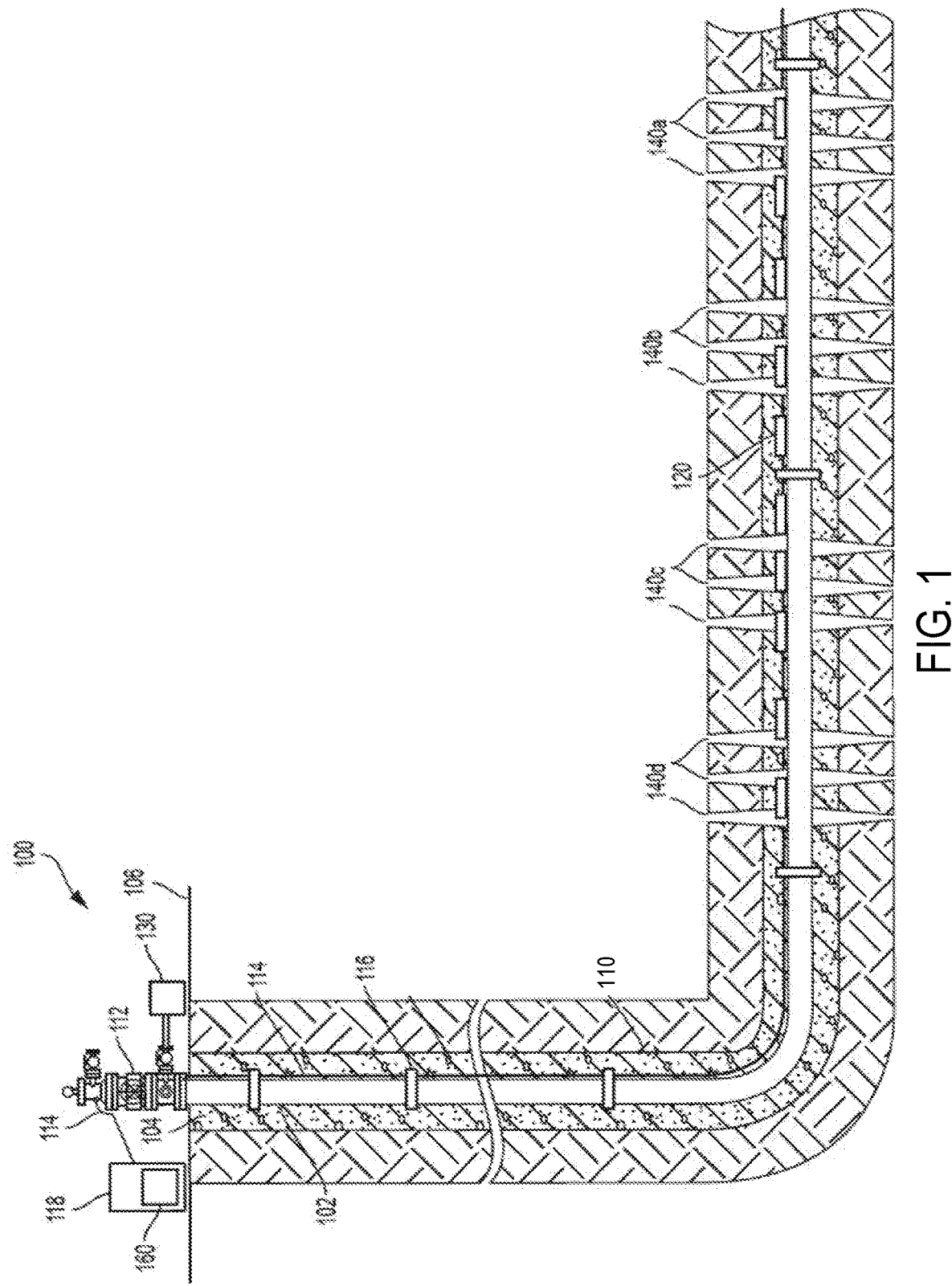
FIG. 1 is a diagram of an example of a well system including a distributed acoustic sensing system with a phase modulator for mitigating faded channels according to one aspect of the present disclosure.

Certain aspects and features relate to mitigating fading in a distributed acoustic sensing system ("DAS") using a phase modulator. A DAS can be used to determine data about an environment of a wellbore, and mitigating fading can improve the accuracy of the data. A DAS can include a phase modulator for modulating a first pulse of an optical signal to have a different wavelength than a second pulse of the optical signal. The first pulse and the second pulse can be launched, at separate times, into a sensing fiber that extends into a wellbore. A first backscattered signal can be generated by the first pulse propagating through the sensing fiber, and a second backscattered signal can be generated by the second pulse propagating through the sensing fiber. A processing device can determine data about the environment of the wellbore by processing the first backscattered signal and the second backscattered signal to compensate for fading in the first backscattered signal or the second backscattered signal.

In some aspects, a DAS may include an interrogation device positioned at a surface proximate to a wellbore and coupled to an optical fiber extending from the surface into the wellbore. An optical source of the interrogation device may transmit an optical signal, or an interrogation signal, downhole into the wellbore through the optical fiber. Backscattering of the optical signal can occur based on the optical signal interacting with the optical fiber and can cause the optical signal to propagate back toward an optical receiver in the interrogation device. In some examples, different backscattering can occur based on acoustic signals causing a vibration in the optical fiber or thermal signals (e.g., changes in temperature) causing thermal expansion of the cable and movement or expansion of the optical fiber. The acoustic signals and the thermal signals may have different frequency content. The optical signal can be analyzed to determine real-time data about an environment of the wellbore, including intensity and location of acoustic signals generated downhole or changes in temperature downhole. A DAS can detect signals anywhere along a length of optical fiber in substantially real time (e.g., real time can be limited by the travel time of the optical pulse from the DAS signal transmitter to the end of the optical fiber and back to the DAS optical receiver). For example, the DAS can measure real-time data about acoustic signals produced by treatment fluid flowing through perforations in the subterranean formation during a hydraulic fracturing process. The real-time data can be used to determine expected flow rates at each perforation cluster in a wellbore.

The power of a backscattered signal can be weak (e.g., typically 1 part per million or lower power relative to the peak power of the interrogation signal). The signal to noise ratio of measurements can be dependent upon the coherent portion of the backscattered power received by an optical receiver. The coherent portion of the backscattered signal can vary significantly because the backscattered signal can be dependent on the ensemble sum of the backscattered light occurring between two locations or segments of the sensing fiber that interferometricaly recombine. The resulting coherence of any of the measurements can range by more than two orders of magnitude. In some aspects, measurements with coherence in a lower portion of the range can be referred to as faded signals. Faded signals can have a coherence below a threshold value such that the faded signals are unsuitable for being used to determine data.

A DAS can include a phase modulator for in-line frequency shifting an optical interrogation signal to synthesize a second optical interrogation signal with a frequency offset. The frequency offset of the second optical interrogation signal can cause the second optical interrogation signal to have a different wavelength than the first optical interrogation signal such that the second optical interrogation signal produces a different backscattered signal or a second set of measurements on the same sensing fiber. The second set of measurements can be uncorrelated with the first set of measurements in regards to channel fading. The two measurement sets can be processed serially during a real-time process or the first set of measurements can be buffered and simultaneously processed with the second set of measurements to reduce the fading of a DAS. In some aspects, the amount of a frequency shift that can de-correlate backscattered signals is inversely proportional to a width of the pulse. For example, a pulse with a 30 ns pulse width may be shifted by approximately 45 MHz to produce a backscattered signal that is de-correlated with a non-shifted pulse. And, a pulse with a 60 ns pulse width may be shifted by approximately 20 MHz to provide a backscattered signal that is de-correlated from a non-shifted pulse.

More de-correlated backscattered signals or measurement sets that can be processed can result in more fading mitigation. For example, processing a second measurement can reduce fading in a single source DAS interrogator from 10% to 0.5%. In additional or alternative examples, a third measurement can reduce the fading to 0.2%, and a fourth measurement can reduce the fading to 0.1%. A DAS including a phase modulator for reducing fading can have a lower cost than a DAS that includes multiple optical sources.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 illustrates an example of a well system 100 that includes a DAS according to some aspects of the present disclosure. The well system 100 includes a casing string 102 positioned in a wellbore 104 that has been formed in a surface 106 of the earth. The well system 100 may have been constructed and completed in any suitable manner, such as by use of a drilling assembly having a drill bit for creating the wellbore 104. The casing string 102 may include tubular casing sections connected by end-to-end coupling bands 116. In some aspects, the casing string 102 may be made of a suitable material such as steel. Within the wellbore 104, cement 110 may be injected and allowed to set between an outer surface of the casing string 102 and an inner surface of the wellbore 104.

At the surface 106 of the wellbore 104, a tree assembly 112 may be joined to the casing string 102. The tree assembly 112 may include an assembly of valves, spools, fittings, etc. to direct and control the flow of fluid (e.g., oil, gas, water, etc.) into or out of the wellbore 104 within the casing string 102. For example, a pump 130 can be coupled to the tree assembly 112 for injecting a treatment fluid into the wellbore 104 as part of a hydraulic fracturing process. The treatment fluid can form the perforation clusters 140a-d through the outer surface of the casing string 102, the cement 110, and a surrounding subterranean formation. Each perforation cluster 140a-d can include one or more fractures and the treatment fluid can include proppant for propping the fractures open such that production fluid can flow from the surrounding subterranean formation into the wellbore 104.

Optical fibers 114 may be routed through one or more ports in the tree assembly 112 and extend along an outer surface of the casing string 102. The optical fibers 114 can include multiple optical fibers. For example, the optical fibers 114 can include one or more single-mode optical fibers or one or more multimode optical fibers. Each of the optical fibers 114 may include one or more optical sensors 120 along the optical fibers 114. The sensors 120 may be deployed in the wellbore 104 and used to sense and transmit measurements of an environment of the wellbore 104 or downhole conditions in the well system 100 to the surface 106. In some examples, the sensors 120 may measure an acoustic signal generated as the treatment fluid from the pump 130 passes through one of the perforation clusters 140a-d. In additional or alternative examples, the sensors 120 may measure a temperature at one of the perforation clusters 140a. The optical fibers 114 may be retained against the outer surface of the casing string 102 at intervals by coupling bands 116 that extend around the casing string 102. The optical fibers 114 may be retained by at least two of the coupling bands 116.

The optical fibers 114 can be coupled to an interrogation subsystem 118. The interrogation subsystem 118 can be part of a DAS, a DTS, or a combination thereof. The interrogation subsystem 118 is positioned at the surface 106 of the wellbore 104. In some aspects, the interrogation subsystem 118 may be an opto-electronic unit that may include devices and components to interrogate sensors 120 coupled to the optical fibers 114. For example, the interrogation subsystem 118 may include an optical source, such as a laser device, that can generate optical signals to be transmitted through one or more of the optical fibers 114 to the sensors 120 in the wellbore 104. The interrogation subsystem 118 may also include an optical receiver to receive and perform interferometric measurements of backscattered optical signals from the sensors 120 coupled to the optical fibers 114.

Although FIG. 1 depicts the optical fibers 114 as being coupled to the sensors 120, the optical fibers 114 can form a sensing optical fiber and operate as a sensor. A sensing optical fiber can be remotely interrogated by transmitting an optical signal downhole through the optical fibers 114. In some examples, Rayleigh scattering from random variations of a refractive index in the optical waveguide can produce backscattered light. By measuring a difference in an optical phase of the scattering occurring at two locations along the optical fibers 114 and tracking changes in the phase difference over time, a virtual vibration sensor can be formed in the region between the two scattering location. By sampling the backscattered optical signals at a high rate (e.g., 100

MHz) the optical fibers 114 can be partitioned into an array of vibration sensors. In some aspects, the interrogation subsystem 118 can include a processing device for processing the backscattered optical signals to determine data about an environment of the wellbore 104. In additional or alternative aspects, the processing device can be separate from, but communicatively coupled to, the interrogation subsystem 118. For example, a processing device can be included in the pump 130 or a tool positioned downhole.

In this example, the interrogation subsystem 118 includes a phase modulator 160 for mitigating fading in the DAS. The phase modulator 160 can modulate one pulse of an optical signal being launched into the optical fibers 114 such that the pulse has a different wavelength than another pulse of the optical signal. Some of the sensors 120 can respond to acoustic signals in the wellbore (e.g., acoustic signals generated by the treatment fluid passing through the perforation clusters 140a-d) and provide backscattered optical signals based on the acoustic signals and the optical signal to the interrogation subsystem 118. By launching pulses into the wellbore 104 having different wavelengths, the interrogation subsystem 118 can receive backscattered signals that have a different pattern of fading. A processing device can process the backscattered signals to mitigate fading by combining the portions of each backscattered signal with an amount of fading below a threshold value. Mitigating the fading can allow the DAS to provide more accurate data representing the environment of the wellbore.

In some aspects, the well system 100 may also include one or more electrical sensors deployed using an electrical cable deployed similarly to the optical fibers 114. In additional or alternative aspects, the optical fibers 114 can be a hybrid opto-electrical cable housing both optical fibers and electrical conductors for electrical sensors.

Figure 4:
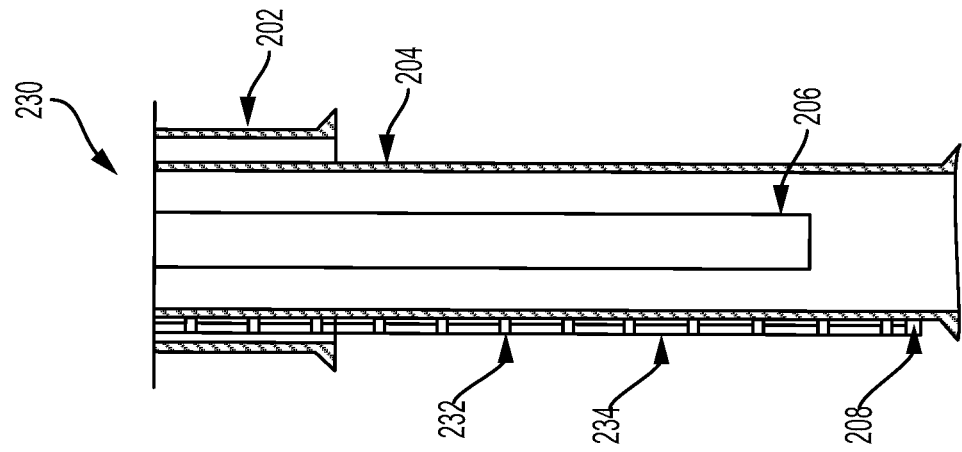
FIGS. 2-4 are schematic diagrams of examples of different types of wellbores each including a distributed acoustic sensing system with a phase modulator for mitigating faded channels according to one aspect of the present disclosure.
Figure 3:
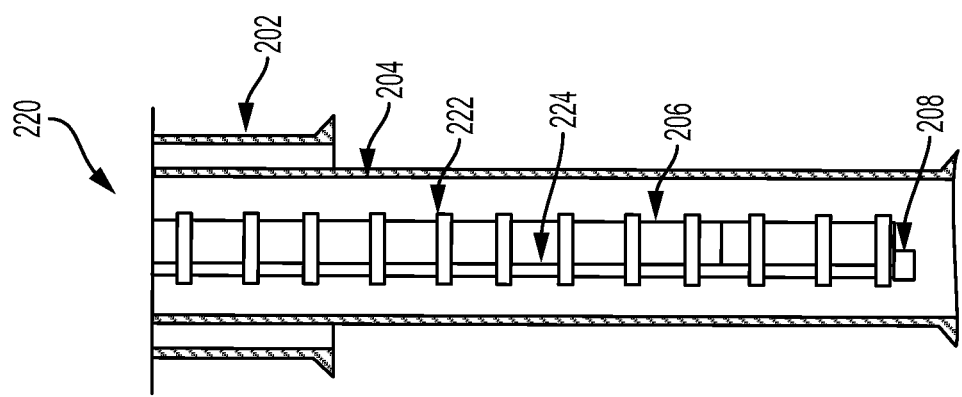
Figure 2:
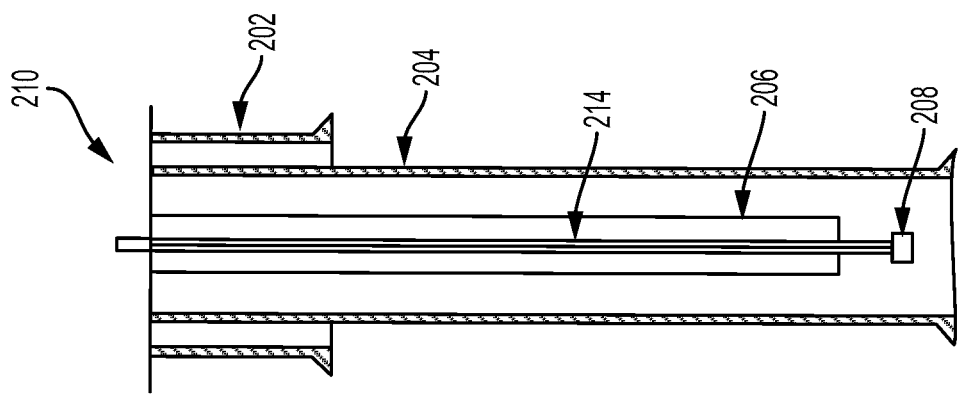

In some aspects, the optical fibers 114 can be positioned exterior to the casing string 102, but other deployment options may also be implemented. For example, FIGS. 2-4 depict schematic diagrams of a DAS being deployed in a variety of well systems 210, 220, 230.

Each of the well systems 210, 220, 230 include a production casing 204 extending through a surface casing 202 and a tubing string 206 extending through the production casing 204. The well system 210 includes optical fibers 214 extending through an inner area of the tubing string 206. The optical fibers 214 may extend through the tubing string 206 such that the optical fibers 214 can be removed independent of the tubing string 206. The well system 220 includes optical fibers 224 coupled to an outer surface of the tubing string 206 by coupling bands 222. The tubing string 206 can include coiled tubing and the optical fibers 224 can be coupled to the coiled tubing such that the optical fibers 214 can be removed with the coiled tubing. In some examples, a tail of the tubing string can extend below a deepest perforation. The well system 230 includes optical fibers 234 extending downhole between the surface casing 202 and the production casing 204. Coupling bands 232 can couple the optical fibers 234 to an exterior surface of the production casing 204.

Figure 5:
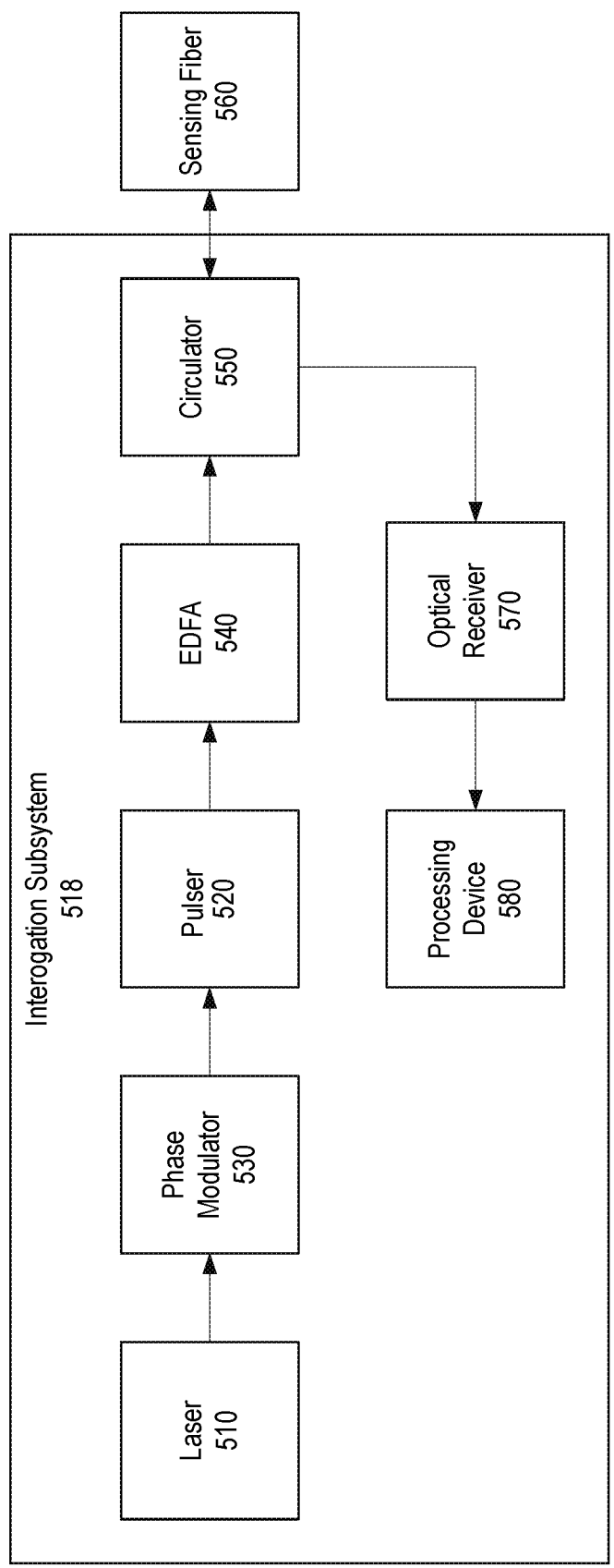
FIG. 5 is a block diagram of an example of an optical intensity-based distributed acoustic sensing system with a phase modulator for mitigating faded channels according to one aspect of the present disclosure.

FIG. 5 is a block diagram of an optical intensity-based DAS that includes a phase modulator 530 for mitigating fading in the DAS. The DAS can include an interrogation subsystem 518 and a sensing fiber 560. In some examples, the interrogation subsystem 518 includes the interrogation subsystem 118 in FIG. 1 and the sensing fiber 560 includes the optical fibers 114.

The interrogation subsystem 518 can include a laser 510, a pulser 520, a phase modulator 530, an erbium-doped fiber amplifier ("EDFA") 540, a circulator 550, an optical receiver 570, and a processing device 580. The laser 510 (e.g., a continuous wave fixed frequency laser) can generate an optical signal, which can be separated into pulses by the pulser 520. The phase modulator 530 can shift the frequency of one of the pulses to modulate the wavelength of the pulse. The EDFA can amplify the pulses and the circulator 550 can launch each pulse into the sensing fiber 560. The circulator 550 can also receive a backscattered signal in response to each pulse from the sensing fiber 560 and direct the backscattered signals to the optical receiver 570. The processing device 580 can be communicatively coupled to the optical receiver for processing the backscattered signals to determine data about an environment of the wellbore. By processing backscattered signals generated from pulses of different wavelength, the processing device 580 can mitigate fading and improve an accuracy of the data. Optical intensity-based DAS can include measuring a trace of intensity signals resulting from backscattered signals. A portion of a received backscattered signal from a particular location along the sensing fiber 560 can vary as $A(t)Cos(\varphi(t)+\theta(t))$, where $\varphi(t)$ can be an acoustic signal of interest and directly proportional to the fiber strain at the particular location caused by the acoustic signal. $A(t)$ and $\theta(t)$ can be slowly varying independent random signals. $A(t)$ and $\theta(t)$ can contribute to measurement errors associated with low signal strength, linearity, and coherence in relation to the actual characteristics of $\varphi(t)$.

In some examples, the laser 510 generates a narrow spectral line width optical signal that can be partitioned into one or more pulses by the pulser 520. The optical signal can have a coherence length much longer than a width of one of the pulses. As a first pulse travels down the sensing fiber 560, backscattered light can be generated from densely spaced scattering sites. The power of a backscattered signal received by the circulator 550 in response to the first pulse propagating through the sensing fiber 560 can be determined by the ensemble sum of the backscattered light from each scattering site. The scattering sites can provide backscattered light with a random phase relationship to each other. At some locations along the sensing fiber 560, the scattering sites can provide backscattered light that predominately add constructively and produce a portion of the backscattered signal received by the interrogation subsystem 518 with a higher optical power. At these locations, the phase relationship between the backscattered light provided by the scattering location can be predominantly $2N*\pi$ where N can be approximately an integer. At other locations, the ensemble sum of the backscattered light provided by multiple scattering sites in a particular region can add destructively. The portion of the backscattered signal from these locations can have a low optical power level due to a relative phase relationship between the backscattered light from each scattering site of approximately $(2N+1)*\pi$, where N can be approximately an integer. The ensemble sum of numerous scattering sites from different regions of the sensing fiber 560 may produce optical intensity backscatter levels that rapidly change from one location to a neighboring location in the sensing fiber 560, which can produce a highly scattered optical time-domain reflectometer ("OTDR") trace.

To change the backscattered power at a particular location along the sensing fiber 560, the frequency of the pulse producing the backscattered signal can be modulated by the phase modulator 530.

For example, a first pulse generated by the laser 510 and phase generator 520 can have a wavelength of 1.5 microns.

Two scattering locations along the sensing fiber 560 that have a two-way (due to two-way travel of the pulse and backscatter) optical path distance between each other of 1.50000075 meters (or 1.5 meters and 0.75 microns) can be $1*10e^6+\frac{1}{2}\lambda$, which can provide a phase difference of $(2N+1)*\pi$, where $N=1*10e^6$ and $\lambda$ is a wavelength of the pulse. The two backscattered light waves can be out of phase by half of the wavelength or $\pi$ radians, and can interfere destructively such that a portion of a first backscattered signal associated with the two scattering locations can have a power level below a threshold level such that the portion is referred to as faded. To change the phase relationship to a constructive phase relation between the two scattering sites, the processing device 580 can cause the phase modulator 530 to increase the wavelength of a second pulse from 1.5 microns to 1.50000075 microns, which is equivalent to a frequency change of approximately 100 MHz. The backscattered light produced from the two locations can be in phase with each other such that a portion of the second backscattered signal associated with the two scattering locations has a power level that exceeds the threshold level.

For scattering sites that are twice as far apart, (e.g., 3 meters+$\frac{1}{2}\lambda$) and destructively interfering, the frequency change used to provide a constructive addition of backscattered light from the two scattering locations can be approximately 50 MHz. This can demonstrate that a frequency shift for changing the phase relationship between the scattering sites by $\pi$ can be inversely proportional to the distance between the scattering sites.

In some examples, the phase modulator 530 can perform serrodyne modulation. The phase modulator 530 can include or be communicatively coupled to a linear ramp function generator (e.g., the multi-ramp circuit 720 in FIG. 7). The ramp function generator can produce a precisely and accurately timed, high fidelity, high speed, moderately high amplitude, voltage ramp signal The slope of the voltage ramp signal can determine the rate of phase change provided by the modulator, which can be related to a frequency shift. One example of a phase modulator for performing serrodyne modulation includes an EOSpace Lithium Niobate waveguide based phase modulator driven by an arbitrary waveform generator.

In additional or alternative examples, the interrogation subsystem 518 can include a controller. The controller can be an independent component or the controller can be included in any of the other components in the interrogation subsystem 518. The controller can include a voltage controlled piezoelectric actuator for modulating the cavity length of the laser 510. The controller can generate a sinusoidal input function to be fed into the voltage controlled piezoelectric actuator. A sinusoidal input function can cause the piezoelectric actuator to modulate the cavity length, but avoid varying the laser cavity due to higher order harmonics. In some aspects, the puller 520 can be controlled by the controller such that pulses can be generated at the peak and trough of the sinusoidal function. The rate of frequency change (e.g., derivative of the sinusoidal function) can be zero and the laser 510 can be at a highest stability to reduce the possibility of introducing noise into the optical signal generated by the laser 510. For example, if the interrogation subsystem 518 is sending pulses at a rate of 10 kHz, the sinusoidal input function can have a frequency of 5 kHz, which can allow for two pulses per cycle timed to the sinusoid maximum and minimum. The two pulses can have a frequency shift of +f and −f, where f is the frequency shift provided by the piezoelectric actuator for a particular voltage amplitude of the sinusoidal input to the piezoelectric actuator.

Although FIG. 5 depicts a block diagram of an optical intensity-based DAS having a single laser, other implementations are possible. In some examples, an optical intensity-based DAS can include more than one laser or other optical sources for generating more than one optical signal. In additional or alternative examples, an optical intensity-based DAS can include more than one phase modulators for modulating pulses associated with more than one optical signal.

Figure 6:
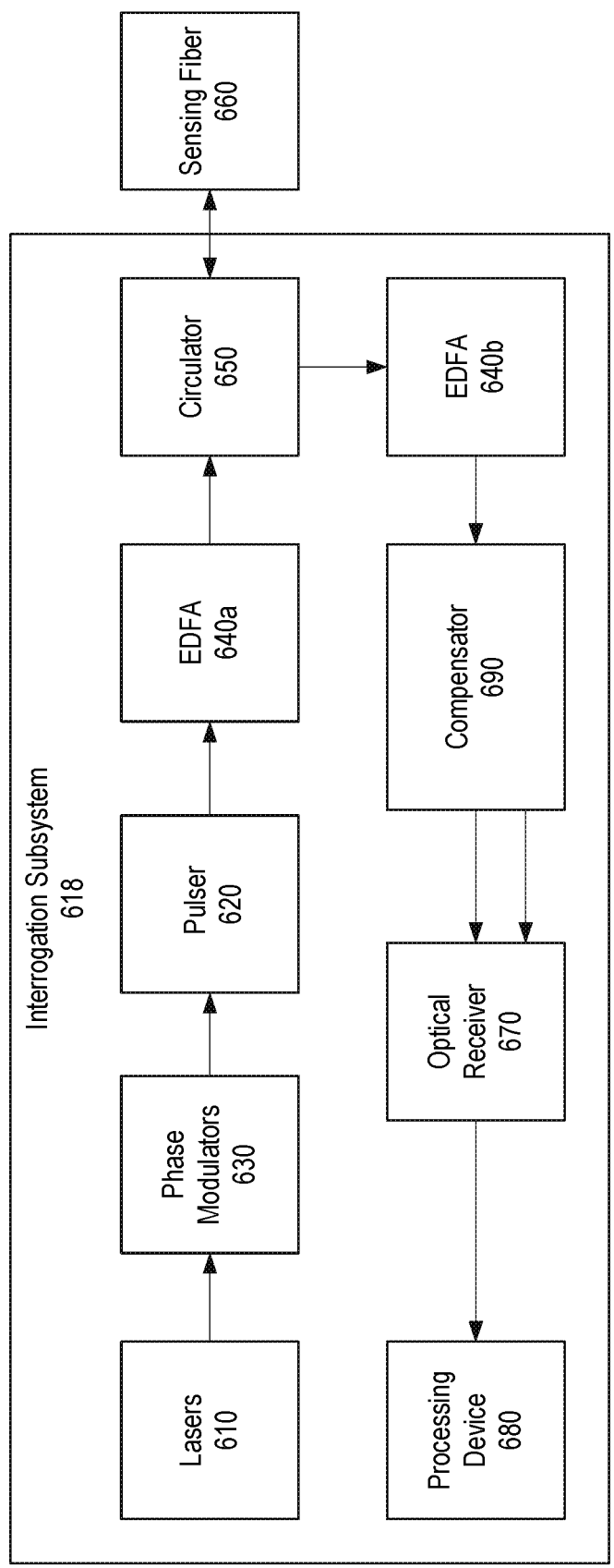
FIG. 6 is a block diagram of an example of an optical phase-based distributed acoustic sensing system with multiple lasers and a phase modulator for mitigating faded channels according to one aspect of the present disclosure.

FIG. 6 depicts a block diagram of an optical phase-based DAS having multiple optical sources. The optical phase-based DAS includes an interrogation subsystem 618 and a sensing fiber 660. The interrogation subsystem includes lasers 610, pulsers 620, phase modulators 630, EDFAs 640a, 640b, a circulator 650, a compensator 690, an optical receiver 670, and a processing device 680. The lasers 610 can generate more than one optical signals, which can each be partitioned into one or more pulses by the pulsers 620. Phase modulators 630 can modulate pulses from each of the optical signals such that at least one pulse has a different wavelength than another pulse. A pulse from each optical signal can be amplified by the EDFA 640a and launched substantially simultaneously into the sensing fiber 660 by the circulator 650. The circulator 650 can receive a number of backscattered signals from the sensing fiber 660 equal to the number of pulses launched into the sensing fiber 660. The circulator can guide the backscattered signals to the EDFA 640b, which can amplify the backscattered signals. The compensator 690 can spit each backscattered signal such that one version of each backscattered signal is delayed. The two versions of each backscattered signal can be received by the optical receiver 670. The processing device 680 can be communicatively coupled to the optical receiver 670 for determining data about an environment of the wellbore based on the versions of each backscattered signal. An optical phase-based DAS can avoid some of the measurement errors in an optical intensity-based DAS by demodulating a phase of backscattered signals using the two versions of the backscattered signals. The processing device can reduce fading by processing data associated with each of the backscattered signals. As in the optical intensity-based DAS of FIG. 5, the processing device 680 can compare the backscattered signals and use unfaded portions of each backscattered signal to generate the data with less fading than at least one of the backscattered signals.

Although FIG. 6 depicts an optical phase-based DAS including multiple optical sources and phase modulators 630, other implementations are possible. For example, an interrogation subsystem for an optical phase-based DAS can include lasers 610 and a single phase modulator for modulating the phase of pulses from one or more of the lasers 610. In additional or alternative examples, an optical phase-based DAS can include a single laser and a single phase modulator.

Figure 7:
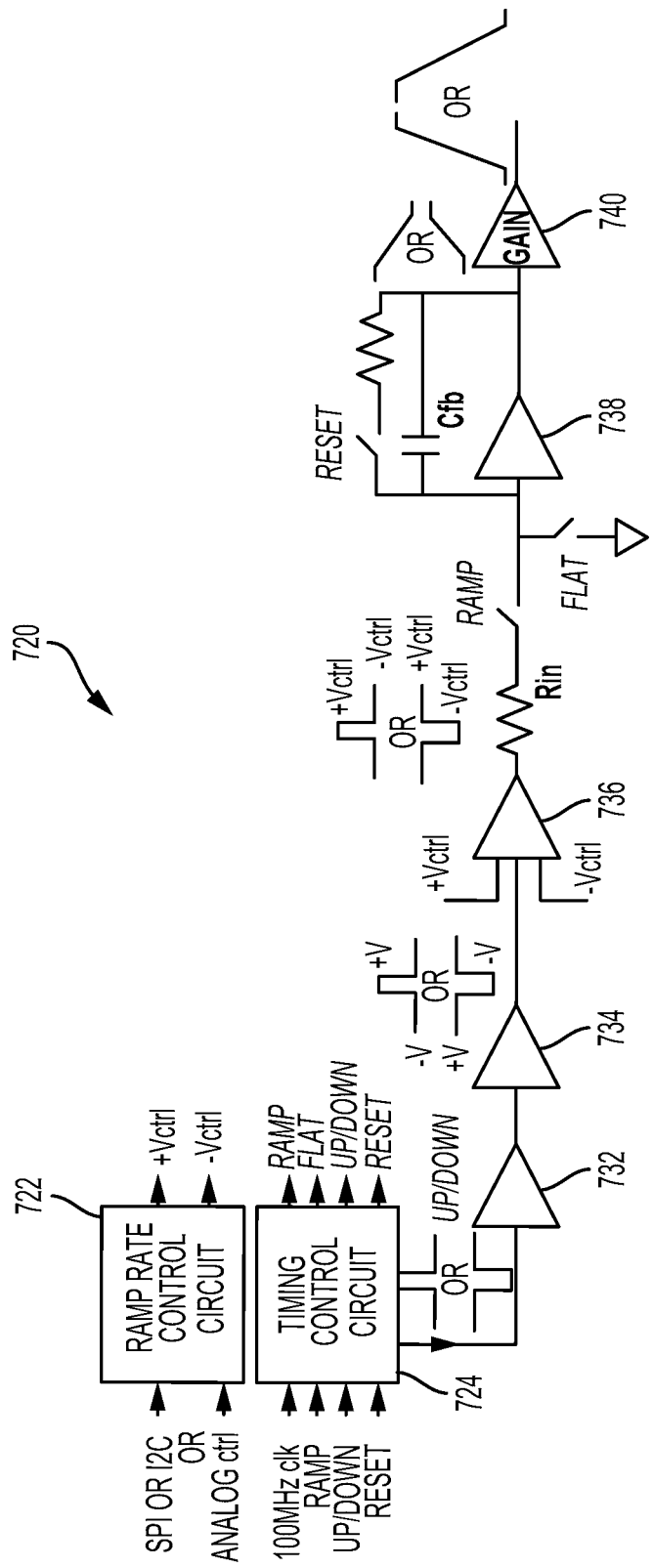
FIG. 7 is a schematic diagram of an example of a multi-ramp circuit for powering a phase modulator as part of a distributed acoustic sensing system for mitigating faded channels according to one aspect of the present disclosure.

FIG. 7 is a schematic diagram of an example of a multi-ramp circuit 720 that can be included in or communicatively coupled to a phase modulator (e.g., the phase modulator 530 in FIG. 5 or the phase modulator 630 in FIG. 6). In some examples, the multi-ramp circuit can provide a ramp-up signal, a ramp-down signal, or a no ramp signal. The multi-ramp circuit 720 can include a ramp rate control circuit 722 and a timing control circuit 724. In some examples, the ramp rate control circuit 722 can receive control signals (e.g., analog control signals, inter integrated circuit ("I2C") signals, or serial-peripheral interface signals ("SPI")) from a processing device and output a high Vctrl and a low Vctrl. The timing control circuit 724 can receive clock signal (e.g., 100 MHz clock signal) and digital control bits (e.g., a reset bit, a ramp bit, and a bit indicating a positive or negative ramp). In some aspects, the multi-ramp circuit 720 can ramp 20 V (e.g., from −10 V to +10 V, or vice versa) in as fast as 40 ns. In additional or alternative aspects, the multi-ramp circuit 720 can have a differential as well as a single-ended output drive. Differentially, the multi-ramp circuit 720 is capable of a 40 V ramp (from −20 V to +20 V or vice versa) in as fast as 40 ns. The voltage levels can be cut in half for a phase modulator with a 50Ω source impedance based on the output drivers having a 50Ω output impedance.

The multi-ramp circuit 720 can generate a ramp by producing fast rising digital pulses of controllable timing (e.g., controllable with 10 ns precision) and a width (e.g., controllable with 10 ns precision), and converting the pulses to fast rising analog pulses of controllable amplitude. In some examples, a digitally timed pulse can be output from the timing control circuit 724 and input to a digital buffer 732, which can be conductively coupled to the input of a pulse buffer 734. The pulse buffer 734 can output a timed analog pulse. The fast rising analog pulses can be integrated to produce high speed ramps of controllable timing, width, rate, and polarity. For example, the output of the pulse buffer 734 can pass through a clamp amplifier 736 and the output of the clamp amplifier 736 can be conductively coupled to an integrator 738. The output of the integrator 738 can be conductively coupled to the driver 740, which can apply a gain to the ramp. Using an analog ramp signal can avoid using a high speed digital to analog converter and can produce a more continuous, linear, high fidelity ramp in comparison to digital approaches. Although only single-ended signal conditioning is shown in FIG. 7, a fully differential pulse and integration approach can be used to create high fidelity, rising and falling ramps that can be immune to component tolerances and other error sources. In some examples, $$\text{Ramp Rate} = \pm \frac{2V_{ctrl}}{R_{in} * C_{fb}} * \text{Gain},$$

where $R_{in}$ is the sum of the $R_{in}$ resistor and the ramp switch "on" resistance. The output of the multi-ramp circuit 720 can be the ramp signal for causing a phase modulator to shift the frequency of different pulses of an optical signal such that each pulse has a different wavelength.

Figure 8:
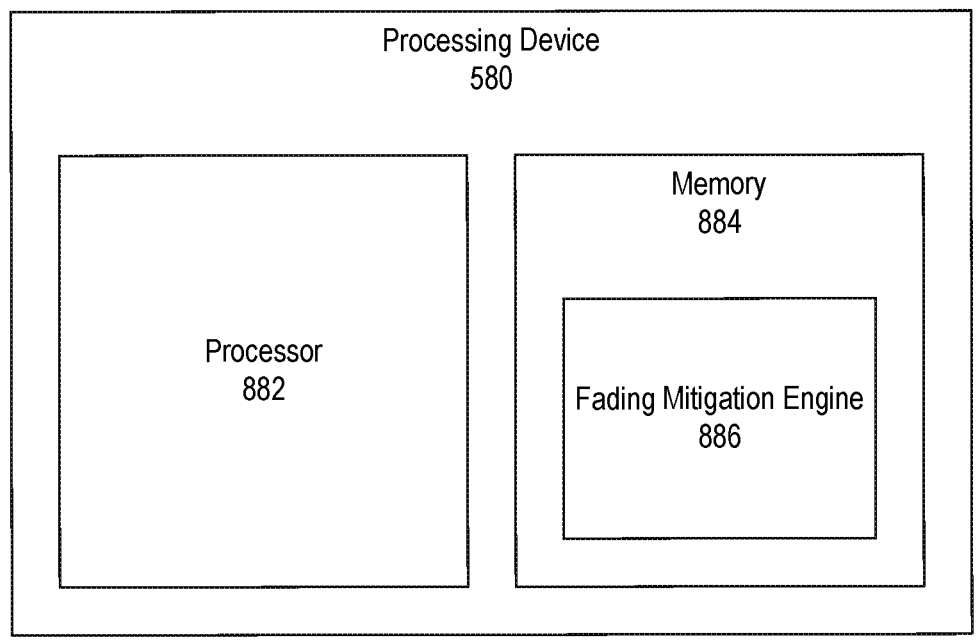
FIG. 8 is a block diagram of an example of a processing device for use in distributed acoustic sensing system for mitigating faded channels according to one aspect of the present disclosure.

FIG. 8 depicts an example of the processing device 580 in FIG. 5.580 The processing device 580 can include any number of processors 882 configured for executing program code stored in memory 884. Examples of the processing device 580 can include a microprocessor, an application-specific integrated circuit ("ASIC"), a field-programmable gate array ("FPGA"), or other suitable processor. In some aspects, the processing device 580 can be a dedicated processing device used for mitigating fading in a DAS. In additional or alternative aspects, the processing device 580 can perform additional functions. In some examples, the processing device 580 can be communicatively coupled to (or included in) a DAS for determining a flow rate of treatment fluid through a perforation based on an acoustic signal. In additional or alternative examples, the processing device 580 can determine a pumping schedule for a hydraulic fracturing process and communicate with a pump to perform the operation.

The processing device 580 can include (or be communicatively coupled with) a non-transitory computer-readable memory 884. The memory 884 can include one or more memory device that can store program instructions. The program instructions can include for example, a fading mitigation engine 886 that is executable by the processing device 580 to perform certain operations described herein.

The operations can include determining data about an environment of a wellbore by processing data from more than one backscattered signal to compensate for fading in one of the backscattered signals. In some examples, the processing device 580 can receive first data associated with a first backscattered signal and second data associated with a second backscattered signal. The first backscattered signal can have been generated based on a first pulse of an optical signal having propagated through a sensing fiber extending into a wellbore. The second backscattered signal can have been generated based on a second pulse of the optical signal having propagated through the sensing fiber. The first pulse or the second pulse can have been modulated by a phase modulator to have a different wavelength than the other. The processing device 580 can process the first data and the second data by determining portions of the first data and the second data that are based on faded portions of the backscattered signals. The processing device 580 can use an unfaded portion on the first data or the second data to compensate for a faded portion in the other.

Figure 9:
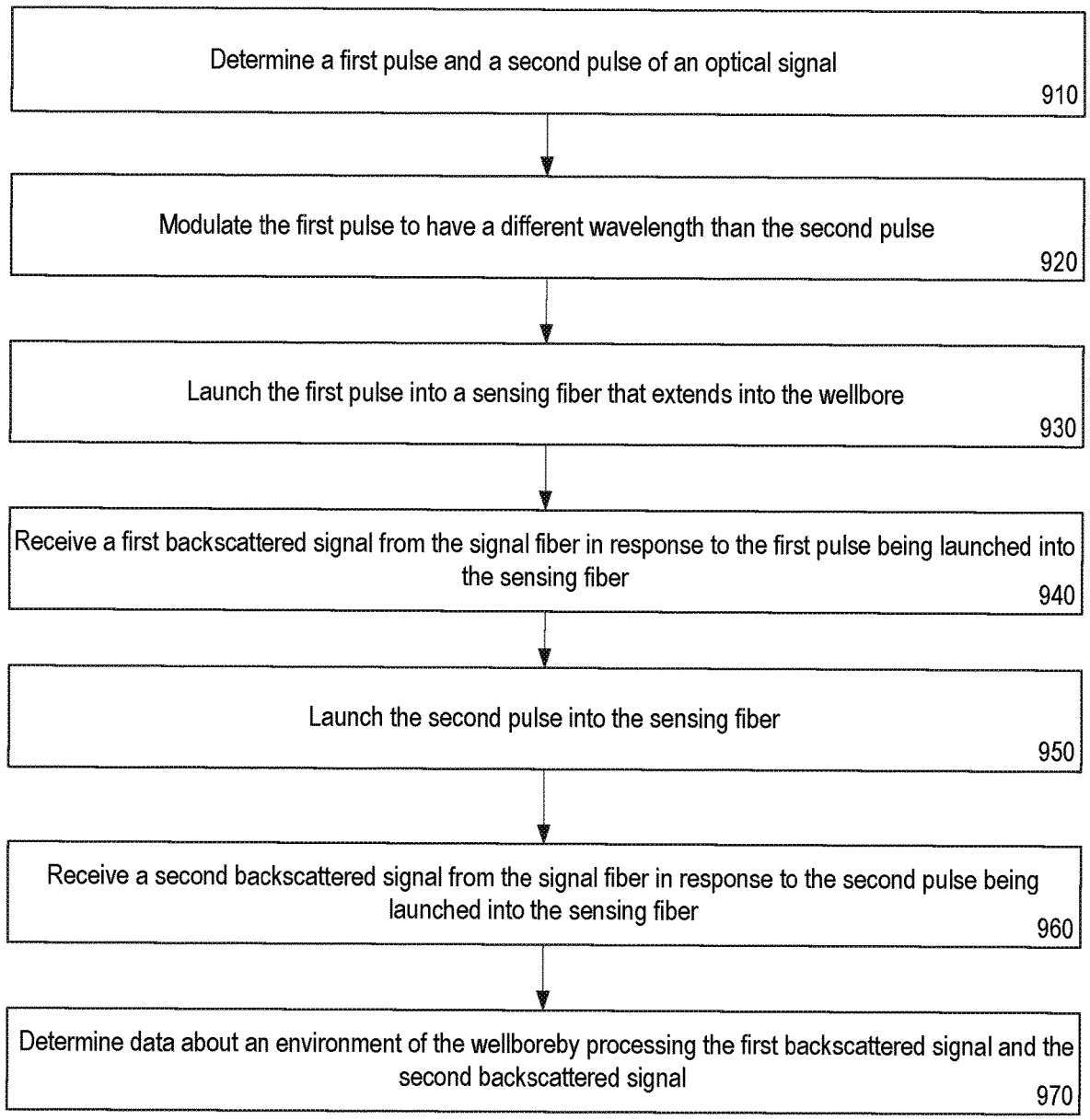
FIG. 9 is a flowchart of an example of a process for mitigating faded channels in a distributed acoustic sensing system using a phase modulator according to one aspect of the present disclosure.

FIG. 9 is a flowchart of a process for mitigating faded channels in a DAS using a phase modulator. The process can improve a signal-to-noise ratio of the returned signals and provide higher precision data about an environment of a wellbore.

In block 910, a first pulse and a second pulse of an optical signal is determined. In some aspects, a DAS can include an optical source (e.g., a laser) that can generate the optical signal including the first pulse and the second pulse. In some aspects, the first pulse and the second pulse may be generated by a puller based on the optical signal. In additional or alternative aspects, the first pulse and the second pulse can each be a number of periods of the optical signal. The first pulse and the second pulse can be amplified before or after being transmitted to a phase modulator.

In block 920, the first pulse is modulated by a phase modulator to have a different wavelength than the second pulse. In some aspects, the phase modulator can include (or be communicatively coupled to) a ramp modulator. The ramp modulator can generate a linear ramp function and a slope of the linear ramp function can be used to control a rate of phase change provided by the phase modulator. In some aspects, a voltage controlled piezoelectric actuator can modulate a cavity length of the optical source such that the first pulse has a different wavelength than the second pulse. In additional or alternative aspects, the phase modulator can modulate the wavelength of the first pulse and the wavelength of the second pulse. For example, the phase modulator can shift a frequency of the first pulse by a positive amount, f, and shift a frequency of the second pulse by a negative amount, −f.

In block 930, the first pulse is launched into the sensing fiber that extends into the wellbore. The sensing fiber can include a single mode or a multimode fiber. The sensing fiber can be behave as a series of sensors by generating backscattered light based on the first pulse and conditions of the environment of the wellbore. The backscattered light can be formed based on the first pulse backscattering at one or more points along the sensing fiber. The backscattered light at each of these points can have a different phase and can interfere with the first pulse as the backscattered light propagates towards the surface and the first pulse propagates deeper into the wellbore. At some points along the sensing fiber, the backscattered light will be in phase with the first pulse such that collision between the signals is constructive. At other points along the sensing fiber, the backscattered light will be out of phase with the first pulse such that collisions between the signals causing fading. In block 940, a first backscattered signal is received from the signal fiber in response to the first pulse being launched into the sensing fiber. The first backscattered signal can include the backscattered light caused by the first pulse propagating through the sensing fiber.

In block 950, the second pulse is launched into the sensing fiber. As with the first pulse, the sensing fiber can be behave as a series of sensors by generating backscattered light based on the second pulse and conditions of the environment of the wellbore. The backscattered light can be generated at the same points along the sensing fiber that generated the backscattered light in response to the first pulse. But, the differing wavelength of the second pulse can cause the backscattered light generated at some points along the sensing fiber to have a different phase than the backscattered light generated by the first pulse. For example, some points in the sensing fiber that generated out of phase backscattered light in response to the first pulse can generate in-phase backscattered light in response to the second pulse. In block 960, a second backscattered signal is received from the signal fiber in response to the second pulse being launched into the sensing fiber. The second backscattered signal can include the backscattered light caused by the second pulse propagating through the sensing fiber.

In block 970, data about an environment of the wellbore is determined by processing the first backscattered signal and the second backscattered signal. In some aspects, fading can be present in different portions of the first backscattered signal as compared to the second backscattered signal. A processing device can process the first backscattered signal and the second backscattered signal to compensate for fading in the first backscattered signal or the second backscattered signal.

In some aspects, the processing device can analyze the first backscattered signal and the second backscattered signal to determine portions or channels of each signal that are faded by comparing a power value for the portion to a threshold value. In some examples, the processing device uses the backscattered signal with a lower percentage of faded portions to determine the data about the environment of the wellbore. In additional or alternative aspects, the processing device compares each portion of the first backscattered signal with each portion of the second backscattered signal and determines the data about the environment associated with each portion based on the backscattered signal with less fading in that portion.

In additional or alternative aspects, the processing device can sum the first backscattered signal and the second backscattered signal. Portions that are faded in the first backscattered signal can be compensated for by a lack of fading in an associated portion of the second backscattered signal. Portions that are faded in the second backscattered signal can be compensated for by a lack of fading in an associated portion of the first backscattered signal.

Although FIG. 9 depicts a process with a first backscattered signal and a second backscattered signal, more than two backscattered signals can be processed to determine more accurate data about the environment of the wellbore. For example, the optical signal can include a third pulse. The third pulse can be modulated by the phase modulator to have a different wavelength than the first pulse or the second pulse and a third backscattered signal can be received from the sensing fiber in response to launching the third pulse into the sensing fiber. The processing device can determine the data about the environment of the wellbore based on processing the first backscattered signal, the second backscattered signal, and the third backscattered signal to compensate for fading in each of the first backscattered signal, the second backscattered signal, and the third backscattered signal.

A DAS can include more than one optical source for generating more than one optical signal. In some examples, the optical signals may have different wavelengths. In additional or alternative examples, the DAS can include more than one phase modulator such that a pulse of each optical signal is modulated to create more than one pulse of a different wavelength. In some aspects, more backscattered signals that have a unique wavelength being received by a processing device can result in more accurate data about the environment of the wellbore that can be generated by the processing device.

In some aspects, a DAS with a phase modulator for mitigating faded channels is provided according to one or more of the following examples:

Example #1

A method can include determining a first pulse and a second pulse of an optical signal. A phase modulator can modulate the first pulse to have a different wavelength than the second pulse. The method can further include launching the first pulse into a sensing fiber that extends into a wellbore. The method can further include receiving a first backscattered signal from the sensing fiber in response to launching the first pulse into the sensing fiber. The method can further include launching the second pulse into the sensing fiber. The method can further include receiving a second backscattered signal from the sensing fiber in response to launching the second pulse into the sensing fiber. The method can further include determining data about an environment of the wellbore by processing the first backscattered signal and the second backscattered signal to compensate for fading in the first backscattered signal or the second backscattered signal.

Example #2

The method of Example #1, further featuring modulating the first pulse to have the different wavelength than the second pulse including shifting, by the phase modulator, a first frequency of the first pulse by an amount. Modulating the first pulse to have a different wavelength can further include shifting, by the phase modulator, a second frequency of the second pulse by a negative version of the amount.

Example #3

The method of Example #1, further featuring modulating the first pulse to a have the different wavelength than the second pulse including the phase modulator being driven by a linear ramp function. A slope of the ramp can determine a rate of phase change provided by the phase modulator.

Example #4

The method of Example #1, further featuring determining the first pulse and the second pulse of the optical signal including receiving the optical signal from an optical source. Modulating the first pulse to have the different wavelength than the second pulse can include modulating a cavity length of the optical source using a voltage controlled piezoelectric actuator.

Example #5

The method of Example #1, further featuring determining the first pulse and the second pulse of the optical signal including determining the first pulse, the second pulse, and a third pulse. The method can further include modulating, by the phase modulator, the third pulse to have a different wavelength than the first pulse or the second pulse. The method can further include launching the third pulse into the sensing fiber. The method can further include receiving a third backscattered signal from the sensing fiber in response to launching the third pulse into the sensing fiber. Determining the data about the environment of the wellbore can further include processing the first backscattered signal, the second backscattered signal, and the third backscattered signal to mitigate the fading that occurs in the first backscattered signal, the second backscattered signal, and the third backscattered signal.

Example #6

The method of Example #5, further featuring modulating the first pulse to have the different wavelength than the second pulse including shifting, by the phase modulator, a first frequency of the first pulse by an amount. Modulating the third pulse to have the different wavelength than the first pulse or the second pulse can include shifting, by the phase modulator, a second frequency of the third pulse by a negative version of the amount. Launching the second pulse into the sensing fiber can include launching the second pulse, unmodulated, into the sensing fiber.

Example #7

The method of Example #1, further featuring determining the first pulse and the second pulse of the optical signal including receiving a first optical signal from a first optical source. The method can further include receiving a second optical signal from a second optical source. The second optical signal can include a third pulse with a different wavelength than the first pulse or the second pulse. The method can further include launching the third pulse into the sensing fiber. The method can further include receiving a third backscattered signal from the sensing fiber in response to launching the third pulse into the sensing fiber. Determining the data about the environment of the wellbore can further include processing the first backscattered signal, the second backscattered signal, and the third backscattered signal to compensate for fading in the first backscattered signal, the second backscattered signal, and the third backscattered signal.

Example #8

The method of Example #1, further featuring determining the data about the environment of the wellbore including determining first data about the environment of the wellbore from the first backscattered signal. Determining the data about the environment of the wellbore can further include analyzing the first data to determine a first portion of the first data that experienced fading that exceeds a threshold value and to determine that the first portion describes a segment of the environment of the wellbore. Determining the data about the environment of the wellbore can further include determining second data about the environment of the wellbore from the second backscattered signal. Determining data about the environment of the wellbore can further include analyzing the second data to determine a second portion of the second data describes the segment of the environment of the wellbore. Determining the data about the environment of the wellbore can further include determining the data about the environment of the wellbore by combining the first data and the second data such that fading is mitigated by using the second portion to describe the segment rather than the first portion.

Example #9

A system can include a phase modulator and an optical receiver. The phase modulator can be communicatively coupled to an optical source for receiving an optical signal comprising a first pulse and a second pulse and for modulating the first pulse to have a different wavelength than the second pulse. The phase modulator can be communicatively coupled to a sensing fiber that is extendable into a wellbore for carrying the first pulse and the second pulse. The optical receiver can be communicatively coupled to the sensing fiber for receiving a first backscattered signal formed in response to the first pulse propagating through the sensing fiber and for receiving a second backscattered signal formed from the second pulse. The optical receiver can be communicatively coupled to a processing device that is usable to determine data about an environment of the wellbore by processing the first backscattered signal and the second backscattered signal to compensate for fading in the first backscattered signal or the second backscattered signal.

Example #10

The system of Example #9, further featuring the phase modulator can be communicatively coupled to the optical source for shifting a first frequency of the first pulse by an amount. The phase modulator can also be communicatively coupled to the optical source for shifting a second frequency of the second pulse by a negative version of the amount.

Example #11

The system of Example #9, further featuring the phase modulator being communicatively coupled to the optical source for performing serrodyne modulation. The system can further include a linear ramp function generator communicatively coupled to the phase modulator for controlling a rate of phase change of the phase modulator based on a slope of a linear ramp function.

Example #12

The system of Example #9, can further include a voltage controlled piezoelectric actuator for modulating a cavity length of the optical source such that the cavity length is different during generation of the first pulse as compared to the second pulse.

Example #13

The system of Example #9, can further include the optical source, the sensing fiber, and the processing device. The optical source can generate the optical signal including the first pulse and the second pulse. The sensing fiber can extend into the wellbore, can generate the first backscattered signal in response to the first pulse propagating through the sensing fiber, and can generate the second backscattered signal in response to the second pulse propagating through the sensing fiber. The processing device can determine the data about the environment of the wellbore by processing the first backscattered signal and the second backscattered signal.

Example #14

The system of Example #13, further featuring the phase modulator can modulate the first pulse by shifting a frequency of the first pulse such that a collision of the portion of the first backscattered signal with the first pulse in the sensing fiber is constructive.

Example #15

The system of Example #13, further featuring the optical source including a plurality of optical sources. Each optical signal of the plurality of optical sources can generate a plurality of optical signals. Each of the optical signals of the plurality of optical signals can include a plurality of pulses. The optical signal can be a first optical signal of the plurality of optical signals. The phase modulator can include a plurality of phase modulators that can modulate at least one pulse of the plurality of pulses of each of the optical signals of the plurality of optical signals to have a different wavelength than other pulses of each of the optical signals of the plurality of optical signals.

Example #16

A non-transitory computer-readable medium can have instructions stored therein. The instructions can be executed by a processing device and can cause the processing device to receive first data associated with a first backscattered signal generated based on a first pulse of an optical signal propagating through a sensing fiber extendable into a wellbore. The instruction can further cause the processing device to receive second data associated with a second backscattered signal generated based on a second pulse of the optical signal propagating through the sensing fiber. The second pulse can have a different wavelength than the first pulse as a result of a phase modulator modulating a wavelength of the second pulse. The instructions can further cause the processing device to determine data about an environment of the wellbore by processing the first data and the second data to compensate for fading in the first backscattered signal or the second backscattered signal.

Example #17

The non-transitory computer-readable medium of Example #16, can further include instructions that can cause the processing device to determine fading occurred in a portion of the first data associated with a segment of the environment of the wellbore. The instructions can further cause the processing device to cause the phase modulator to shift a frequency of the second pulse such that fading is reduced in a portion of the second data associated with the segment of the environment of the wellbore.

Example #18

The non-transitory computer-readable medium of Example #17, can further include instructions that can cause the processing device to cause the phase modulator to shift the frequency of the second pulse by adjusting a slope of a ramp signal generated by a linear ramp function generator communicatively coupled to the phase modulator.

Example #19

The non-transitory computer-readable medium of Example #17, can further include instructions that can be executed to cause the processing device to shift the frequency of the second pulse by adjusting a voltage applied to a voltage controlled piezoelectric actuator that can modulate a cavity length of an optical source that generates the optical signal.

Example #20

The non-transitory computer-readable medium of Example #17, can further include instructions that can be executed to determine the data about the environment of the wellbore by combining the first data and the second data to form the data such that the portion of the second data is used to determine a portion of the data associated with the segment of the environment of the wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
determining a first pulse and a second pulse of an optical signal;
modulating, by a phase modulator, the first pulse to have a different wavelength than the second pulse;
launching the first pulse into a sensing fiber that extends into a wellbore; receiving a first backscattered signal from the sensing fiber in response to launching the first pulse into the sensing fiber;
launching the second pulse into the sensing fiber;
receiving a second backscattered signal from the sensing fiber in response to launching the second pulse into the sensing fiber; and
determining data about an environment of the wellbore by processing the first backscattered signal and the second backscattered signal to compensate for fading in the first backscattered signal or the second backscattered signal, further comprising:
determining first data about the environment of the wellbore from the first backscattered signal;
analyzing the first data to determine a first portion of the first data that experienced fading that exceeds a threshold value and to determine that the first portion describes a segment of the environment of the wellbore;
determining second data about the environment of the wellbore from the second backscattered signal;
analyzing the second data to determine a second portion of the second data describes the segment of the environment of the wellbore; and
determining the data about the environment of the wellbore by combining the first data and the second data such that fading is mitigated by using the second portion to describe the segment rather than the first portion.

2. The method of claim 1, wherein modulating the first pulse to have the different wavelength than the second pulse comprises:
    shifting, by the phase modulator, a first frequency of the first pulse by an amount; and
    shifting, by the phase modulator, a second frequency of the second pulse by a negative version of the amount.

3. The method of claim 1, wherein modulating the first pulse to have the different wavelength than the second pulse comprises the phase modulator being driven by a linear ramp function, wherein a slope of the ramp determines a rate of phase change provided by the phase modulator.

4. The method of claim 1, wherein determining the first pulse and the second pulse of the optical signal comprises receiving the optical signal from an optical source, wherein modulating the first pulse to have the different wavelength than the second pulse comprises modulating a cavity length of the optical source using a voltage controlled piezoelectric actuator.

5. The method of claim 1, wherein determining the first pulse and the second pulse of the optical signal comprises determining the first pulse, the second pulse, and a third pulse, the method further comprising:
    modulating, by the phase modulator, the third pulse to have a different wavelength than the first pulse or the second pulse;
    launching the third pulse into the sensing fiber; and
    receiving a third backscattered signal from the sensing fiber in response to launching the third pulse into the sensing fiber,
    wherein determining the data about the environment of the wellbore further comprises processing the first backscattered signal, the second backscattered signal, and the third backscattered signal to mitigate the fading that occurs in the first backscattered signal, the second backscattered signal, and the third backscattered signal.

6. The method of claim 5, wherein modulating the first pulse to have the different wavelength than the second pulse comprises shifting, by the phase modulator, a first frequency of the first pulse by an amount, wherein modulating the third pulse to have the different wavelength than the first pulse or the second pulse comprises shifting, by the phase modulator, a second frequency of the third pulse by a negative version of the amount, wherein launching the second pulse into the sensing fiber comprises launching the second pulse, unmodulated, into the sensing fiber.

7. The method of claim 1, wherein determining the first pulse and the second pulse of the optical signal comprises receiving a first optical signal from a first optical source, the method further comprising:
    receiving a second optical signal from a second optical source, the second optical signal comprising a third pulse with a different wavelength than the first pulse or the second pulse;
    launching the third pulse into the sensing fiber; and
    receiving a third backscattered signal from the sensing fiber in response to launching the third pulse into the sensing fiber,
    wherein determining the data about the environment of the wellbore further comprises processing the first backscattered signal, the second backscattered signal, and the third backscattered signal to compensate for fading in the first backscattered signal, the second backscattered signal, and the third backscattered signal.

8. A system comprising:
    an optical source for generating an optical signal comprising a first pulse and a second pulse;
    a phase modulator communicatively coupleable to the optical source for receiving the optical signal comprising the first pulse and the second pulse and for modulating the first pulse to have a different wavelength than the second pulse;
    a sensing fiber that is extendable into a wellbore, the phase modulator being communicatively coupleable to the sensing fiber for carrying the first pulse and the second pulse; and
    an optical receiver communicatively coupleable to the sensing fiber for receiving a first backscattered signal formed in response to the first pulse propagating through the sensing fiber and for receiving a second backscattered signal formed from the second pulse, the optical receiver being communicatively coupleable to a processing device that is usable to determine data about an environment of the wellbore by processing the first backscattered signal and the second backscattered signal and combining a first portion of the first backscattered signal with a second portion of the second backscattered signal to compensate for fading in the first backscattered signal or the second backscattered signal.

9. The system of claim 8, wherein the phase modulator is further communicatively coupleable to the optical source for:
    shifting a first frequency of the first pulse by an amount; and
    shifting a second frequency of the second pulse by a negative version of the amount.

10. The system of claim 8, wherein the phase modulator is communicatively coupleable to the optical source for performing serrodyne modulation, the system further comprising a linear ramp function generator communicatively coupleable to the phase modulator for controlling a rate of phase change of the phase modulator based on a slope of a linear ramp function.

11. The system of claim 8, further comprising a voltage controlled piezoelectric actuator for modulating a cavity length of the optical source such that the cavity length is different during generation of the first pulse as compared to the second pulse.

12. The system of claim 8, wherein the phase modulator modulates the first pulse by shifting a frequency of the first pulse such that a collision of a portion of the first backscattered signal with the first pulse in the sensing fiber is constructive.

13. The system of claim 8, wherein the optical source comprises a plurality of optical sources, each optical signal of the plurality of optical sources for generating a plurality of optical signals, each of the optical signals of the plurality of optical signals comprising a plurality of pulses, the optical signal being a first optical signal of the plurality of optical signals, wherein the phase modulator comprises a plurality of phase modulators for modulating at least one pulse of the plurality of pulses of each of the optical signals of the plurality of optical signals to have a different wavelength than other pulses of each of the optical signals of the plurality of optical signals.

14. A non-transitory computer-readable medium in which instructions are stored, the instructions being executable by a processing device for causing the processing device to:
    receive first data associated with a first backscattered signal generated based on a first pulse of an optical signal propagating through a sensing fiber extendable into a wellbore;
    receive second data associated with a second backscattered signal generated based on a second pulse of the optical signal propagating through the sensing fiber, the second pulse having a different wavelength than the first pulse as a result of a phase modulator modulating a wavelength of the second pulse;

determine fading occurred in a faded portion of the first data associated with a segment of an environment of the wellbore;

cause the phase modulator to shift a frequency of the second pulse such that fading is reduced in a select portion of the second data associated with the segment of the environment of the wellbore; and determine data about the environment of the wellbore by combining (i) the select portion of the second data in which fading was reduced, and (ii) a portion of the first data that does not include the faded portion.

15. The non-transitory computer-readable medium of claim 14, further comprising instructions that are executable to cause the phase modulator to shift the frequency of the second pulse by adjusting a slope of a ramp signal generated by a linear ramp function generator communicatively coupled to the phase modulator.

16. The non-transitory computer-readable medium of claim 14, further comprising instructions that are executable to shift the frequency of the second pulse by adjusting a voltage applied to a voltage controlled piezoelectric actuator for modulating a cavity length of an optical source that generates the optical signal.

* * * * *